United States Patent
Chang et al.

(10) Patent No.: US 9,651,937 B2
(45) Date of Patent: May 16, 2017

(54) COMPUTING DEVICE AND METHOD FOR COMPENSATING COORDINATES OF POSITION DEVICE

(71) Applicant: ScienBiziP Consulting (Shenzhen) Co., Ltd., Shenzhen (CN)

(72) Inventors: Chih-Kuang Chang, New Taipei (TW); Xin-Yuan Wu, Shenzhen (CN); Lu Yang, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 294 days.

(21) Appl. No.: 14/524,140

(22) Filed: Oct. 27, 2014

(65) Prior Publication Data

US 2015/0120037 A1   Apr. 30, 2015

(30) Foreign Application Priority Data

Oct. 28, 2013   (CN) .......................... 2013 1 0516000

(51) Int. Cl.
*G05B 19/19* (2006.01)
*G05B 19/404* (2006.01)

(52) U.S. Cl.
CPC .. *G05B 19/404* (2013.01); *G05B 2219/31262* (2013.01); *Y02P 90/08* (2015.11)

(58) Field of Classification Search
CPC ........ G05B 19/404; G05B 2219/31262; Y02P 90/08

See application file for complete search history.

(56) References Cited

U.S. PATENT DOCUMENTS

| | | | | |
|---|---|---|---|---|
| 7,092,543 | B1 * | 8/2006 | Mahoney | H04R 25/65 381/322 |
| 7,372,558 | B2 * | 5/2008 | Kaufman | G03B 31/00 356/237.2 |
| 2012/0114175 | A1 * | 5/2012 | Hwang | G06K 9/00208 382/103 |
| 2012/0232835 | A1 * | 9/2012 | Chang | G06F 17/5086 702/150 |
| 2013/0342877 | A1 * | 12/2013 | Askan | G06T 17/00 358/463 |

* cited by examiner

*Primary Examiner* — Carlos Ortiz Rodriguez
(74) *Attorney, Agent, or Firm* — Steven Reiss

(57) ABSTRACT

A computing device compensates a coordinate of a position device for a computerized numerical control (CNC) machine. The computing device generates a point cloud according to contour points of the position device. The computing device deletes selected contour points from the point cloud upon the condition that the distance corresponding to each selected contour point exceeds a predetermined threshold. The computing device calculates an average coordinate of the contour points which are remained in the point cloud.

16 Claims, 3 Drawing Sheets

COMPUTING DEVICE AND METHOD FOR COMPENSATING COORDINATES OF POSITION DEVICE

CROSS-REFERENCE TO RELATED APPLICATIONS

This application claims priority to Chinese Patent Application No. 201310516000.2 filed on Oct. 28, 2013, the contents of which are incorporated by reference herein.

FIELD

Embodiments of the present disclosure relate to measurement technology, and particularly to a computing device and a method for compensating coordinates of a position device in a computerized numerical control (CNC) machine.

BACKGROUND

Computerized numerical control (CNC) machines are used to process a product (for example, a shell of a mobile phone). A CNC machine measures a product to capture images of the product. The CNC machine typically includes a position device, which is used to determine a position of a mold placed on a platform. However, the position device wears down eventually from repeated use, and thus a coordinate of a gravity point of the position device changes. Thus, after repeated use, the position device cannot accurately determine the position of the mold.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
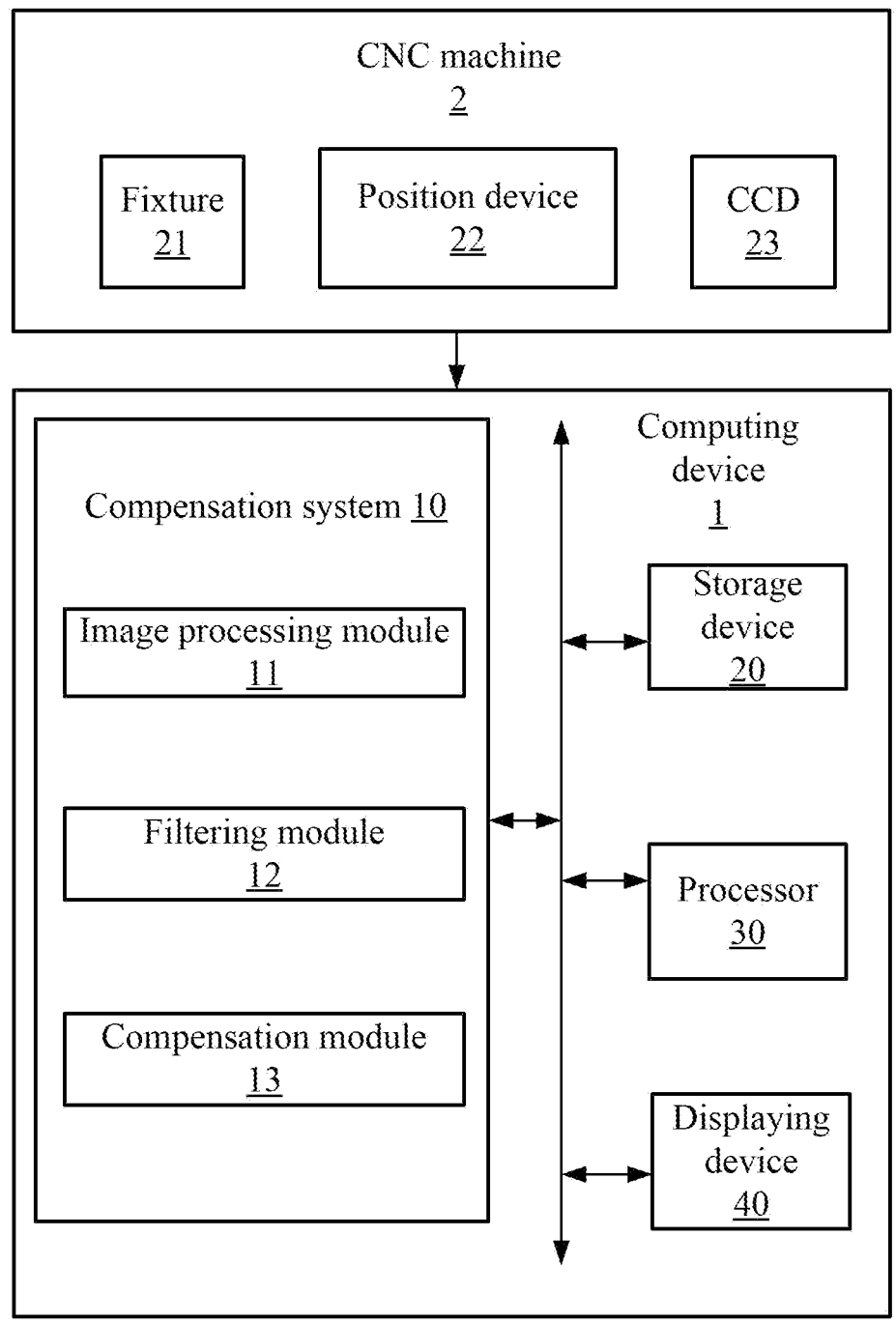
FIG. 1 is a block diagram of an example embodiment of a computing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 illustrates a block diagram of an example embodiment of a computing device 1. In at least the embodiment, the computing device 1 provides functions of connections, so that a computerized numerical control (CNC) machine 2 can be connected to the computing device 1. In other embodiments, the computing device 1 can be integrated into the CNC machine 2. That is, the computing device 1 is a part of the CNC machine 2.

The computing device 1 can be, but is not limited to, a mobile phone, a tablet computer, a server, a personal computer or any other computing device. In the example embodiment, the computing device 1 includes, but is not limited to, a compensation system 10, a storage device 20, at least one processor 30, and a displaying device 40. FIG. 1 illustrates only one example of the computing device 1, and other examples can comprise more or fewer components than those shown in the embodiment, or have a different configuration of the various components.

In at least one embodiment, the storage device 20 can be an internal storage device, such as a flash memory, a random access memory (RAM) for temporary storage of information, and/or a read-only memory (ROM) for permanent storage of information. The storage device 20 can also be an external storage device, such as an external hard disk, a storage card, or a data storage medium. The at least one processor 30 can be a central processing unit (CPU), a microprocessor, or other data processor chip that performs functions of the computing device 1.

Figure 2:
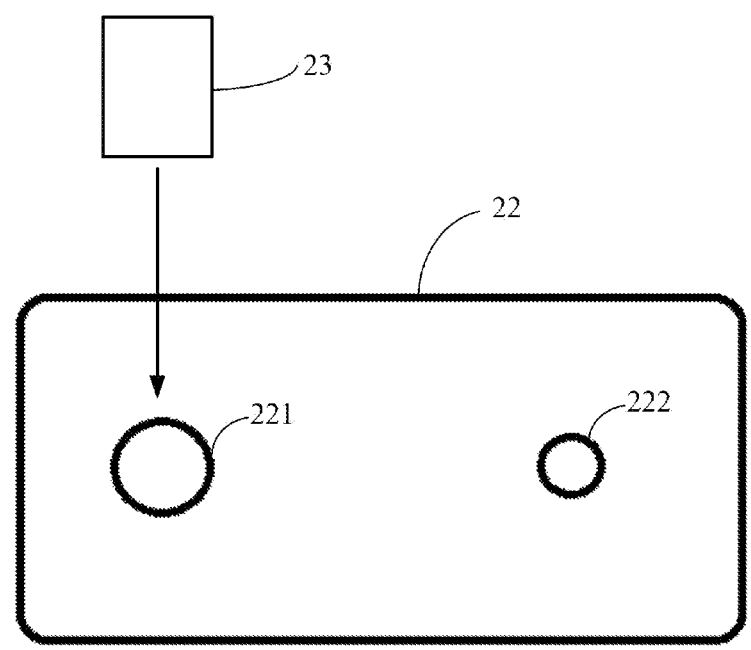
FIG. 2 shows a diagrammatic view of an example of a position device.

The CNC machine 2 includes a fixture 21, a position device 22, and a charge coupled device (CCD) 23. In at least one embodiment, the position device 22 is fixed onto the CNC machine 2 by the fixture 21. The position device 22 is parallel with a platform of the CNC machine 2. The position device 22 includes two or more location columns, such as a first location column 221 and a second location column 222 as shown in FIG. 2. The position device 22 is used to determine a position of a mold placed on the platform of the CNC machine 2 when the CNC machine 2 processes a product (e.g., a shell of an electronic device) using the mold. In at least one embodiment, the CCD 23 is fixed onto a CNC principle axis of the CNC machine 2. The CNC principle axis is vertical to the platform of the CNC machine 2. In addition, to ensure an axis of an imaging plane of the CCD 23 is vertical to a processing plane of the CNC machine 2, a perpendicularity error needs to satisfy a predetermined precision requirement, for example, is less than 0.1 millimeter (mm). The imaging plane of the CCD 23 can be regarded as a plane which is parallel with the platform of the CNC machine 2. The processing plane of the CNC machine 2 can be regarded as another plane which is parallel with the platform of the CNC machine 2.

In at least one embodiment, the CCD 23 captures images of the position device 22. The images of the position device 22 are processed using a binary processing method, so that contour points of the position device 22 are obtained. A contour of the position device 22 is generated using the contour points of the position device 22. Furthermore, the contour points of the position device 22 are regarded as a point cloud of the position device 22.

The compensation system 10 comprises, but is not limited to, an image processing module 11, a filtering module 12, and a compensation module 13. Modules 11-13 can comprise computerized instructions in the form of one or more computer-readable programs that can be stored in a non-transitory computer-readable medium, for example the storage device 20, and executed by the at least one processor 30 of the computing device 1. A detailed description of the functions of the modules 11-13 is given below in reference to FIG. 3.

Figure 3:
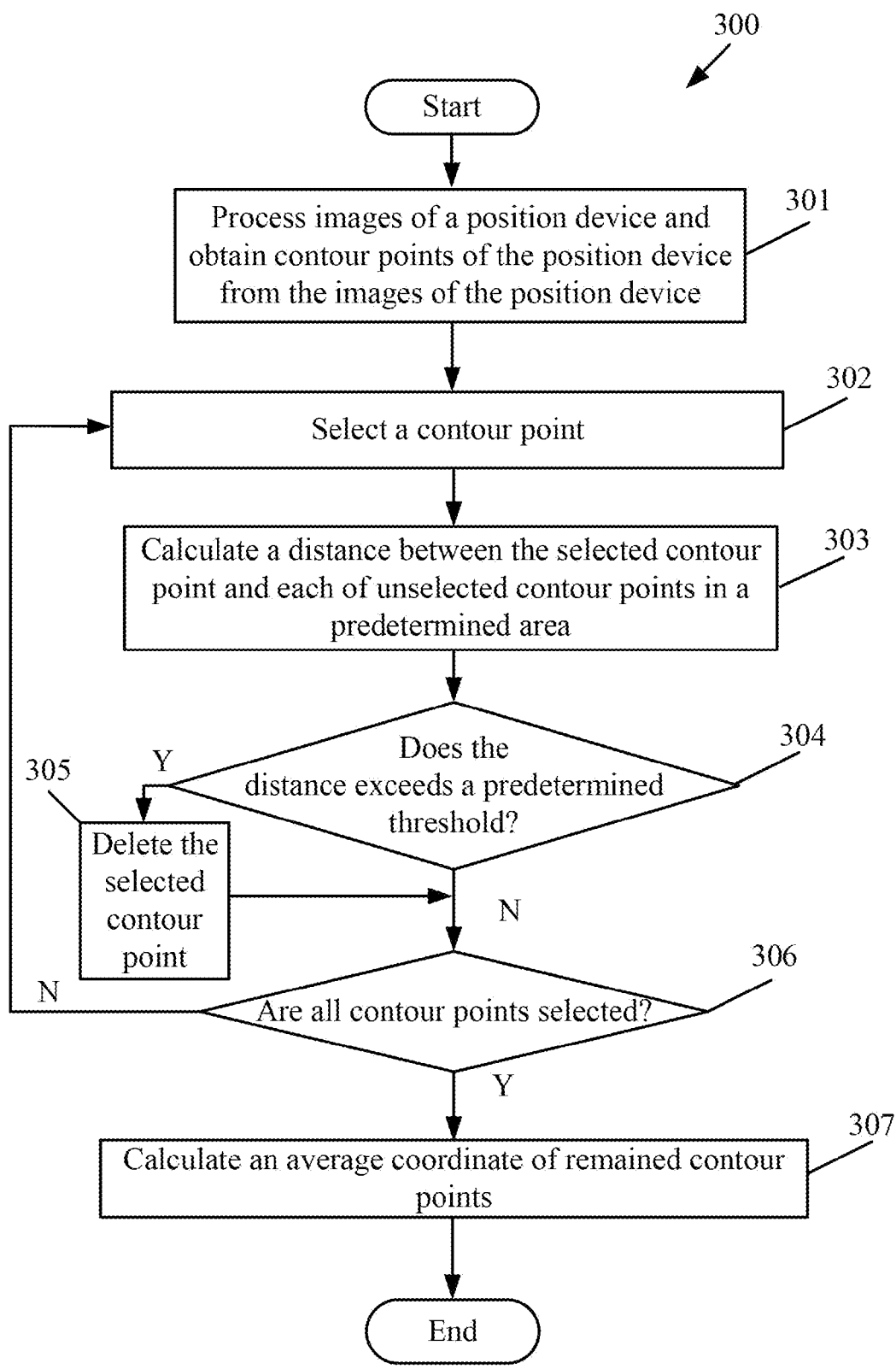
FIG. 3 is a flowchart of an example embodiment of a method for compensating coordinates of the position device.

FIG. 3 illustrates a flowchart of an example embodiment of a method for compensating coordinates of a position device of a CNC machine. In an example embodiment, the method is performed by execution of computer-readable software program codes or instructions by at least one processor of a computing device, and can automatically compensate coordinates of the position device 22 of the CNC machine 2.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1 and 3, for example, and various elements of these figures are referenced in explaining example method 300. Each block shown in FIG. 3 represents one or more processes, methods, or subroutines, carried out in the method 300. Furthermore, the illustrated order of blocks is illustrative only and the order of the blocks can be changed. Additional blocks can be added or fewer blocks may be utilized without departing from this disclosure. The example method 300 can begin at block 301.

In block 301, the image processing module 11 processes the images of position device 22 to obtain contour points of the position device 22. The image processing module 11 generates a point cloud according to the contour points of the position device 22. In at least one embodiment, the image processing module 11 processes the images of the position device 22 using a binary processing method to generate pixel gray values of each image. The image processing module 11 further obtain the contour points using the pixel gray values of each image. For example, if a pixel gray value of the image exceeds a predetermined pixel gray value (e.g., 155) which is at a range of [0, 255], the pixel gray value of the image is regarded as a contour point of the position device 22.

In block 302, the filtering module 12 randomly selects a contour point from the point cloud. In at least one embodiment, the filtering module 12 selects the contour point using a random function. In other embodiments, the filtering module 12 selects the contour point from the point cloud in a predetermined order, for example, a name of the contour point.

In block 303, the calculation module 13 calculates a distance between the selected contour point and each of unselected contour points in a predetermined area corresponding to the selected contour point. The predetermined area can be a circle area corresponding to the selected contour point, and the selected contour point is a center point of the circle area, and a radius (for example, 1 centimeter) of the circle area is predetermined by a user or a specific rule (for example, a length of a product). If the predetermined area includes three unselected contour points (for example, unselected contour points A1, A2 and A3) besides the selected contour point, the calculation module 13 calculates a distance between the selected contour point and the contour point A1, the calculation module 13 calculates a distance between the selected contour point and the contour point A2, and the calculation module 13 calculates a distance between the selected contour point and the contour point A3.

In block 304, the filter module 12 determines if the distance exceeds a predetermined threshold. If none of distances exceeds the predetermined threshold, the procedure goes to block 306. Otherwise, if one or more distances exceed the predetermined threshold, the procedure goes to block 305.

In block 305, the filtering module 12 further deletes the selected contour point from the point cloud. In at least one embodiment, if one or more distances exceed the predetermined threshold, the selected contour point is regarded as a noise point which needs to be removed.

In block 306, the filtering module 12 determines all of the contour points are selected. If all of the contour points are selected, the procedure goes to block 307. That is, each contour point in the point cloud is processed. Otherwise, if the contour points include a contour point which is not selected, the procedure returns to block 302.

In block 307, the compensation module 13 calculates an average coordinate of the contour points which are remained in the point cloud. The compensation module 13 uses the average coordinate as a coordinate of a gravity point of the position device 22 when the position device 22 is driven to determine the position of the mold. In addition, the compensation module 13 further calculates a difference between the average coordinate and a reference coordinate. The reference coordinate is predetermined according to a specification of the position device 22. If the difference is greater than a predetermined value, an alert is generated to notify a maintenance engineer in charge of the position device 22. The alert can be a short message, an e-mail or a dialog box displayed in the displaying device 40.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including, the full extent established by the broad general meaning of the terms used in the claims.

What is claimed is:

1. A computing device, comprising:
   at least one processor; and
   a storage device that stores one or more programs, which when executed by the at least one processor, cause the at least one processor to:
   process images of a position device for a computerized numerical control (CNC) machine to obtain contour points of the position device;
   generate a point cloud according to the contour points of the position device;
   select a contour point from the point cloud;

calculate a distance between the contour point selected from the point cloud and each unselected contour point in a predetermined area corresponding to the contour point;

delete the contour point from the point cloud upon the condition that the distance corresponding to each of the selected contour points exceeds a predetermined threshold; and calculate an average coordinate of contour points remaining in the point cloud and confirm the average coordinate as a coordinate of a gravity point of the position device.

2. The computing device of claim 1, wherein the at least one processor further calculates a difference between the average coordinate and a reference coordinate.

3. The computing device of claim 2, wherein an alert is generated when the difference is greater than a predetermined value.

4. The computing device of claim 1, wherein the predetermined area is a circle area corresponding to the selected contour point.

5. The computing device of claim 4, wherein a center point of the circle area is the selected contour point and a radius of the circle area is predetermined.

6. The computing device of claim 1, wherein the images of the position device are processed using a binary processing method.

7. The computing device of claim 1, wherein the contour points of the position device are obtained by performing of:

processing the images of the position device using a binary processing method to generate pixel gray values of each image; and obtaining the contour points using the pixel gray values of each image.

8. The computing device of claim 7, wherein a pixel gray value of each image is determined as a contour point upon the condition that the pixel gray value of the image exceeds a predetermined pixel gray value.

9. A computer-based method for compensating a coordinate of a position device of a computerized numerical control (CNC) machine using a computing device, the method comprising:

a) processing images of a position device for the CNC machine to obtain contour points of the position device;

(b) generating a point cloud according to the contour points of the position device;

(c) selecting a contour point from the point cloud;

(d) calculating a distance between the contour point selected from the point cloud and each of unselected contour points in a predetermined area corresponding to the contour point;

(e) deleting the selected contour point from the point cloud upon the condition that the distance exceeds a predetermined threshold, and repeating step (c) to step (e) until all of the contour points in the point cloud are selected; and (f) calculating an average coordinate of contour points remaining in the point cloud, and confirming the average coordinate as a coordinate of a gravity point of the position device.

10. The method of claim 9, further comprising:

calculating a distance between the average coordinate and a reference coordinate.

11. The method of claim 10, wherein an alert is generated when the difference is greater than a predetermined value.

12. The method of claim 9, wherein the predetermined area is a circle area corresponding to the selected contour point.

13. The method of claim 12, wherein a center point of the circle area is the selected contour point and a radius of the circle area is predetermined.

14. The method of claim 9, wherein the images of the position device are processed using a binary processing method.

15. The method of claim 9, wherein the contour points of the position device are obtained by performing of:

processing the images of the position device using a binary processing method to generate pixel gray values of each image; and obtaining the contour points using the pixel gray values of each image.

16. The method of claim 15, wherein a pixel gray value of each image is determined as a contour point upon the condition that the pixel gray value of the image exceeds a predetermined pixel gray value.

* * * * *